(12) United States Patent
Jang

(10) Patent No.: US 8,380,123 B2
(45) Date of Patent: Feb. 19, 2013

(54) ARRANGEMENT METHOD OF THE DISTRIBUTED REPEATER AND SYSTEM THEREOF

(75) Inventor: Jae Seon Jang, Daejeon (KR)

(73) Assignee: KT Corporation, Gyeonggi-do (KR)

( * ) Notice: Subject to any disclaimer, the term of this patent is extended or adjusted under 35 U.S.C. 154(b) by 266 days.

(21) Appl. No.: 12/812,445

(22) PCT Filed: Dec. 29, 2008

(86) PCT No.: PCT/KR2008/007739
§ 371 (c)(1),
(2), (4) Date: Aug. 20, 2010

(87) PCT Pub. No.: WO2009/088164
PCT Pub. Date: Jul. 16, 2009

(65) Prior Publication Data
US 2010/0317285 A1    Dec. 16, 2010

(30) Foreign Application Priority Data
Jan. 9, 2008 (KR) .................. 10-2008-0002490

(51) Int. Cl.
*H04B 3/36* (2006.01)
(52) U.S. Cl. ............. 455/7; 455/13.1; 455/16; 455/429; 455/443; 455/444
(58) Field of Classification Search .................. None
See application file for complete search history.

(56) References Cited

U.S. PATENT DOCUMENTS

| | | | |
|---|---|---|---|
| 5,152,002 A | 9/1992 | Leslie et al. | |
| 5,970,410 A | 10/1999 | Carney et al. | |
| 2004/0001464 A1* | 1/2004 | Adkins et al. | 370/335 |
| 2004/0219876 A1* | 11/2004 | Baker et al. | 455/7 |
| 2007/0160014 A1* | 7/2007 | Larsson | 370/338 |
| 2009/0168687 A1* | 7/2009 | Li et al. | 370/315 |

FOREIGN PATENT DOCUMENTS
KR    10-0751833 B1    8/2007

OTHER PUBLICATIONS
International Search Report for PCT/KR2008/007739 filed Dec. 29, 2008.

\* cited by examiner

*Primary Examiner* — Yuwen Pan
*Assistant Examiner* — Fanghwa Wang
(74) *Attorney, Agent, or Firm* — IP Legal Services, LLC

(57) ABSTRACT

The present invention relates to a method of arranging distributed repeaters and distributed repeater system in a mobile communication system. In a method of arranging at least one base station and repeaters in a mobile communication system, a base station cell is formed and N repeater service areas are formed at boundaries of the base station cell. A base station is arranged at the center of the base station cell and N repeaters are arranged at boundaries between the base station service area and the repeater service areas. The number of repeaters is determined and output powers of the base station and the repeaters are determined according to a ratio of a base station service radius (R) to each repeater service radius (r). Accordingly, UARI or DARI is decreased, and coverage holes and excessive coverage overlaps can be remarkably reduced, so that network average capacity can be improved.

12 Claims, 6 Drawing Sheets

R : BASE STATION SERVICE RADIUS
r : REPEATER SERVICE RADIUS
$\Phi_{rr}$ : RATIO OF BASE STATION SERVICE RADIUS TO REPEATER SERVICE RADIUS $$N_r = 2 \cdot \left(\frac{R}{r}\right) + 1 = 2\Phi_{rr} + 1$$

310 : THE OTHER CELL INTERFERENCE

320 : THE GIVEN CELL OTHER USER INTERFERENCE OF THE $ith$ MOBILE STATION

410 : THE OTHER CELL INTERFERENCE
420 : THE GIVEN CELL OTHER USER INTERFERENCE
OF THE $i$th MOBILE STATION

ARRANGEMENT METHOD OF THE DISTRIBUTED REPEATER AND SYSTEM THEREOF

TECHNICAL FIELD

The present invention relates, in general, to a mobile communication network system and method of arranging the system, and, more particularly, to a method of arranging distributed repeaters and a distributed repeater system therefor, which can increase uplink and downlink capacities by arranging repeaters in a distributed manner.

BACKGROUND ART

With the rapid development of mobile communication service, high-quality communication service is required in secluded places among mountains, remote islands, shadow areas in metropolitan areas, subways, tunnels and apartments which have a low need for communication service and to which mobile communication service has not been sufficiently provided to date. However, a communication service provider making a large investment in increasing base stations in shadow areas may deteriorate the business balance of the communication service provider and may cause losses attributable to the inefficiency of the large investment at the national level in the worst case. A 'repeater system' capable of realizing high communication quality and improving a service coverage at low cost has been utilized as a method of dealing with such a problem.

Recently, as the period when one person has one mobile phone has come, scientific technology fields, which are basis thereof, may representatively include the introduction of the concept of cellular communication, the development of wireless transmission technology (commercialization of Code Division Multiple Access: CDMA), and the development of optical transmission technology.

The concept of cellular communication is intended to solve the problem of inefficient communication capacity and quality attributable to a limited frequency spectrum, which is the largest restriction imposed on wireless communication, by dividing an entire area into units called cells and by improving efficiency of frequency reuse, thus providing an opportunity to develop wireless mobile communication. The development of wireless transmission technology provides an opportunity to develop wireless mobile communication from the standpoint of the digitization of a wireless communication system.

Methods of extending cell coverage by introducing repeaters to a mobile communication system have been attempted in various fields. For example, Working Group 4 (WG4) of Wireless World Research Forum (WWRF) has attempted to extend cell coverage and improve a transfer rate by introducing repeaters to a mobile communication system. For this purpose, WWRF proposed to arrange grating-shaped repeaters in a Manhattan city scenario in which metropolitan situations are considered, and also proposed a transmission frame structure suitable for the grating-shaped repeaters.

Further, WWRF proposed a cooperative relaying method using several stages of repeaters in "Technologies for the wireless future chapter 6, WWRF2005", and also analyzed the performance of the cooperative relaying method. However, such an attempt reaches a level in which the utility of repeaters in a classical meaning is merely regulated, so that estimation implying that it is difficult to regard such an attempt as a new idea and to predict great usefulness thereof is dominant.

In addition, WINNER Project composed of 43 unions, such as a plurality of businesses and universities in Europe, is also conducting research for introducing repeaters to an existing mobile communication network and realizing the improvement of performance. The structure of "Wireless multi-hop mesh network" proposed by WINNER is intended to secure redundancy by maintaining topology between repeaters in a mesh structure and to secure transmission efficiency by maintaining a connection between each repeater and a terminal in a Point-to-Multi-Point (PMP) structure ("Description of identified new relay based radio network deployment concepts and first assessment by comparison against benchmarks of well known deployment concepts using enhanced radio interface technologies", IST-2003-507581 WINNER D3.1).

In addition, a Time Division Duplex (TDD)-based Heterogeneous Relay Node (HERN) system has presented the typical meaning of the allocation of time slots and frequency resources, but does not mention a detailed algorithm thereof. Further, the system proposed both Initiative Marketing Digital Radio (IMDR), which is a relaying method between terminals performed in consideration of multi-user diversity, and a coded bi-directional relaying method, which shortens a relaying time for repeaters, in "Definition and assessment of relay based cellular deployment concepts for future radio scenarios considering 1st protocol characteristics, IST-2003-507581 WINNER D3.4". However, the system does not present a method of arranging repeaters to eliminate interference between cells and a resource allocation algorithm related thereto.

Further, a current mobile communication network is configured in the form of six hexagonal cells around a single cell in the case of a 3-sector base station, as shown in FIG. 1. In such a cell structure, average capacity that can be provided by a single base station is about 55% of the maximum capacity of the base station due to interference signals from adjacent base stations. That is, in the case of a base station capable of providing a maximum capacity of 10 Mbps, mobile stations uniformly distributed around the base station are provided with a service capacity of about 5.5 Mbps on the average in the current situation, and thus capacity efficiency is low.

DISCLOSURE

Technical Problem

Accordingly, the present invention has been made keeping in mind the above problems occurring in the prior art, and an object of the present invention is to not only provide a system that is capable of improving network average capacity by decreasing a ratio of the other-cell interference to the other-user interference in the serving cell (UARI or DARI) and by remarkably reducing coverage holes and excessive coverage overlaps, but also enable a network to be easily and rapidly configured.

Technical Solution

In order to accomplish the above object, the present invention provides a method of arranging at least one base station and repeaters in a mobile communication system, comprising the steps of forming a base station cell and forming a plurality of repeater service areas at boundaries of the base station cell; and arranging a base station at a center of the base station cell and arranging a plurality of repeaters at the boundaries between a base station service area and the repeater service areas, wherein a number of repeaters is determined and output powers of the base station and the repeaters are determined according to a ratio of a radius (R) of the base station service area to a radius (r) of each repeater service area.

Preferably, the base station cell may include three sectors, and the number of repeaters (N) arranged in each sector of the base station cell may be determined by the following equation N=2*(R/r)+1. Preferably, the repeaters may be arranged such that a ratio of another cell interference to another user interference in a serving cell is minimized. Preferably, the output powers of the base station and the repeaters may satisfy the following equation:

$$P_b = \frac{(\Phi_{rr})^\gamma \cdot P_{cb}}{(2\Phi_{rr}+1)+(\Phi_{rr})^\gamma}$$

$$P_r = \frac{P_{cb}}{(2\Phi_{rr}+1)+(\Phi_{rr})^\gamma}$$

where $P_b$ is output power of the base station, $P_r$ is output power of each repeater, $P_{cb}$ is a sum of powers to be used, $\Phi_{rr}$ is the ratio (R/r) of the base station service radius to the repeater service radius, and $\gamma$ is a path loss exponent corresponding to a radio environment.

Further, preferably, the repeaters may be arranged at boundaries between the base station service area and the repeater service areas, and the plurality of repeaters may be installed at one location.

In addition, the present invention provides a distributed repeater system, comprising a plurality of base stations constructed such that a single base station cell is formed using a plurality of sectors and the base stations are spaced apart from each other by a predetermined distance; and repeaters configured to form at least one repeater service area at a boundary of the base station cell in each sector, wherein a number of repeaters is determined and output powers of the base station and the repeaters are determined according to a ratio of a radius (R) of the base station service area to a radius (r) of each repeater service area.

Preferably, the base station cell may include three sectors, and the number of repeaters (N) arranged in each sector of the base station cell may be determined by the following equation N=2*(R/r)+1. Preferably, the output powers of the base station and the repeaters may satisfy the following equation:

$$P_b = \frac{(\Phi_{rr})^\gamma \cdot P_{cb}}{(2\Phi_{rr}+1)+(\Phi_{rr})^\gamma}$$

$$P_r = \frac{P_{cb}}{(2\Phi_{rr}+1)+(\Phi_{rr})^\gamma}$$

where $P_b$ is output power of the base station, $P_r$ is output power of each repeater, $P_{cb}$ is a sum of powers to be used, $\Phi_{rr}$ is the ratio (R/r) of the base station service radius to the repeater service radius, and $\gamma$ is a path loss exponent corresponding to a radio environment.

Furthermore, preferably, the repeaters may be implemented as one of frequency conversion repeaters, microwave repeaters, and optical repeaters, may be arranged at locations at which a ratio of another cell interference to another user interference in a serving cell is minimized, and may be located at the boundaries between the base station service area and the repeater service areas, wherein the plurality of repeaters may be installed at one location.

Advantageous Effects

Accordingly, the present invention is advantageous in that it not only can provide a system which is capable of improving network average capacity by decreasing a ratio of the other-cell interference to the other-user interference in the serving cell (UARI or DARI) and by remarkably reducing coverage holes and excessive coverage overlaps, but also can enable a network to be rapidly configured because service is provided using three repeaters through the installation of a single cable, and then the installation of the network is simplified.

BEST MODE

Figure 1:
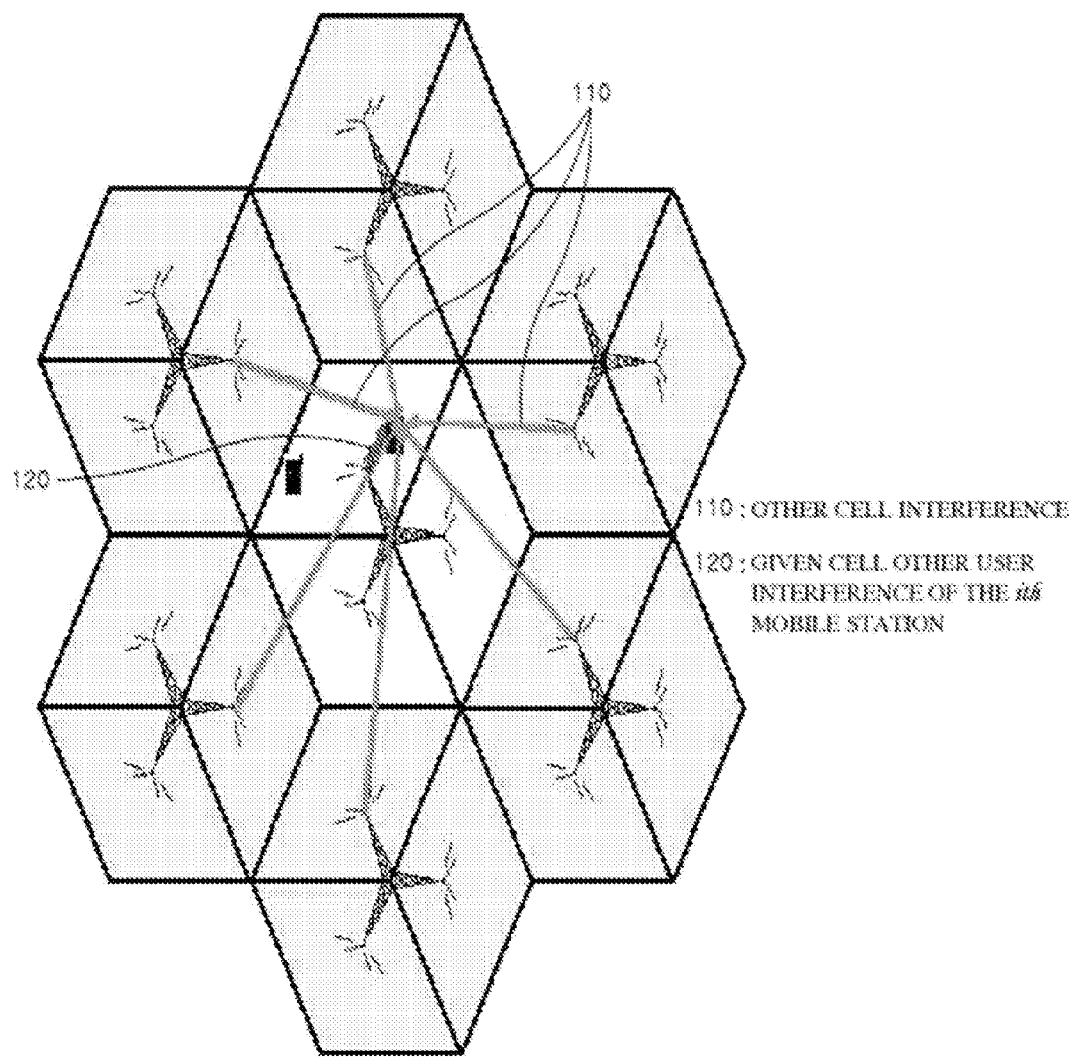
FIG. 1 is a diagram showing the construction of a conventional mobile communication network system.
Figure 2:
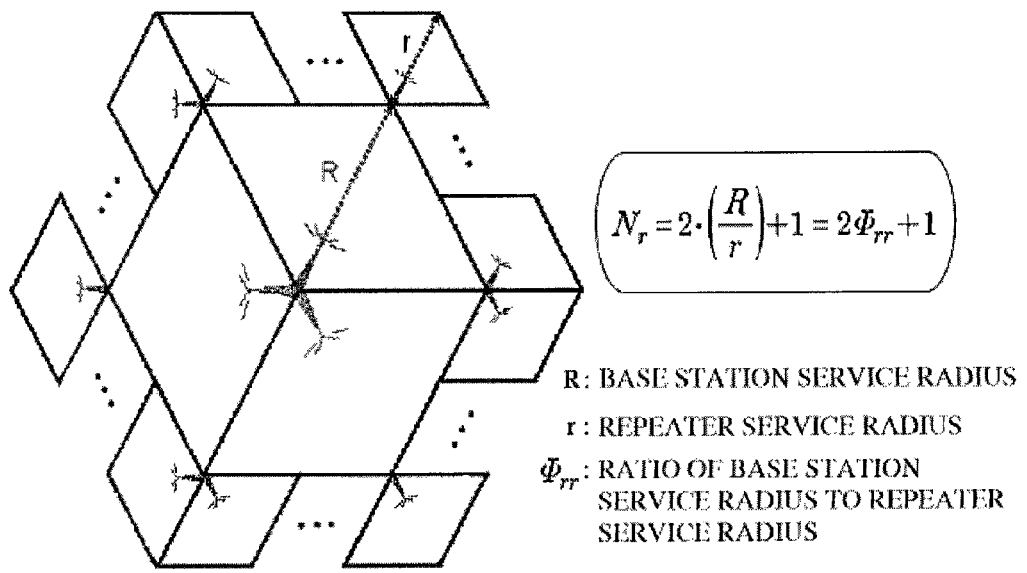
FIG. 2 is a diagram showing the construction of a distributed repeater system according to an embodiment of the present invention.

FIG. 2 is a diagram showing the construction of a distributed repeater system according to the present invention. As shown in FIG. 2, the distributed repeater system is constructed such that a single cell composed of three sectors is formed around a single base station and N repeaters are arranged at the boundaries of the cell.

That is, the present invention proposes a system and arrangement method therefor, in which a single cell is configured using one piece of three-sector base station equipment and N repeaters in each sector so as to increase average capacity that can be provided by a conventional network structure.

In this case, the number of repeaters in each sector of the base station cell is N=2*(R/r)+1. That is, this scheme employs a method of dividing each cell into a plurality of sectors, configuring a single sector using three repeaters when the radius (R) of a base station service area (hereafter referred to as a 'base station service radius') is identical to the radius (r) of a repeater service area (hereafter referred to as a 'repeater service radius'), configuring a single sector using five repeaters when the base station service radius (R) is twice the repeater service radius (r), and configuring a single sector using seven repeaters when the base station service radius (R) is three times the repeater service radius (r). When the network is configured in this way, the average ratio (uplink or downlink average ratio) of the other-cell interference to the other-user interference in the serving cell (UARI or DARI) is decreased, and thus average capacity that can be provided by the base station can be improved.

The largest demand of mobile communication service in WCDMA communication is to design a system for high-speed data processing. The development of a new transmission scheme continuously enables the capacities of various systems to be improved. A typical cell structure requires the improvement of the capacity and coverage of a high-speed mobile communication network. However, most cell structures have coverage holes or excess coverage overlaps due to inappropriate power allocation to a base station and repeaters, as described above. If the output powers of the base station and the repeaters are allocated in proportion to path loss exponents corresponding to radio environments, the structures of cells can be formed without resulting in coverage holes or excessive coverage overlaps.

In consideration of this, the present invention proposes a distributed repeater system and method of arranging repeaters, thus remarkably reducing coverage holes and excessive coverage overlaps, and deriving equations useful for output power to be allocated. Further, through such an equation, the cell structure of the present invention can be maintained in a regular hexagonal shape in spite of the radio environment.

The capacity of the cell structure of the distributed repeater system according to the present invention is further increased compared to the capacity of a conventional cell structure. Important parameters for determining capacity include a UARI or DART, an orthogonal factor (OF), and the height of a repeater antenna. Hereinafter, the means and effects of the present invention will be described in relation to an increase in capacity efficiency of the system structure proposed in the present invention based on UARI or DARI.

As shown in FIG. 2, the repeater system is constructed such that one or more repeater, for example, N repeaters are arranged in each sector at the boundary of a base station cell which has a regular hexagonal shape and is composed of three sectors around a single base station, that is, the boundary between a base station service area (R), which is partitioned, and each repeater service area (r) (outside the area R). The repeater system is configured such that the number of repeaters is determined and output powers are allocated to the base station and the repeaters according to the ratio of the base station service radius (R) to the repeater service radius (r), that is, $\Phi_{rr}$=R/r. That is, a base station cell area (R+r area) includes N repeater service areas outside the base station service area in each sector, in addition to the base station service area. The base station service area (R) is covered by the base station, and each repeater service area (r) is covered by a corresponding repeater.

The output powers of the base station and each repeater are determined by the following Equation (1).

$$P_b = \frac{(\Phi_{rr})^\gamma \cdot P_{cb}}{(2\Phi_{rr} + 1) + (\Phi_{rr})^\gamma} \quad (1)$$

$$P_r = \frac{P_{cb}}{(2\Phi_{rr} + 1) + (\Phi_{rr})^\gamma}$$

(where $P_b$ is output power of the base station, $P_r$ is output power of the repeater, $P_{cb}$ is the sum of powers to be used, $\Phi_{rr}$ is the ratio (R/r) of the base station service radius to the repeater service radius, and γ is a path loss exponent corresponding to a radio environment).

When the base station and the repeaters are arranged and are allocated the output powers according to Equation (1), UARI or DARI is decreased, so that coverage holes or excessive coverage overlaps can be remarkably reduced, and thus average capacity that can be provided by the network structure can be further improved upon compared to that of the conventional network structure.

Figure 3:
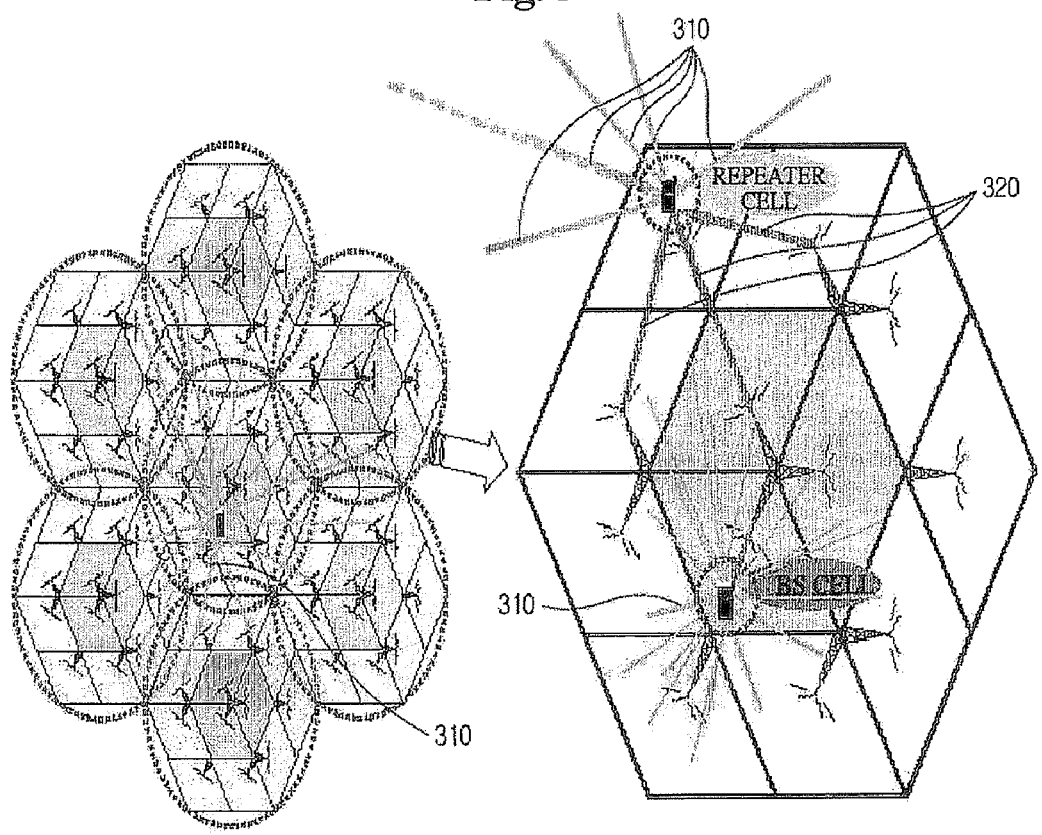
FIG. 3 is a diagram showing the construction of a distributed repeater system according to another embodiment of the present invention.

FIG. 3 is a diagram showing the construction of a distributed repeater system according to another embodiment of the present invention. As shown in FIG. 3, repeaters are arranged at the boundary of a base station cell composed of three sectors, but the number of repeaters in each sector is set as a number satisfying an equation of N=2*(R/r)+1, and the powers of the base station and the repeaters are allocated to satisfy Equation (1).

FIG. 3 illustrates the case where the size of the base station service radius (R) is identical to that of each repeater service radius (r). In order to improve capacity up to a maximum value, the output powers of the base station and the repeaters must be suitably distributed according to the ratio of the service radiuses of the base station and the repeater (R/r). As shown in FIG. 3, a conventional base station sector is divided into four regions, wherein one of the four regions is covered by the base station and the remaining three regions are covered by the repeaters. The three repeaters are located at boundaries at which base station service area and distributed repeater service areas meet in each base station sector. The output power of the base station sector is identical to the output power of each repeater sector. The reason for this is that the coverage of the base station sector must be identical to that of each repeater sector. That is, it can be seen in Equation (1) that, when a value of $\Phi_r$(R/r) is 1, the output power of the base station is identical to that of each repeater.

In this way, the area of the conventional base station sector is allocated as the base station service area and the repeater service areas, but the number of repeaters and output powers are determined according to the ratio of the base station service radius to the repeater service radius (R/r), so that the system capable of improving the average capacity of a network by decreasing UARI or DARI and by remarkably reducing coverage holes and excessive coverage overlaps can be provided.

Figure 4:
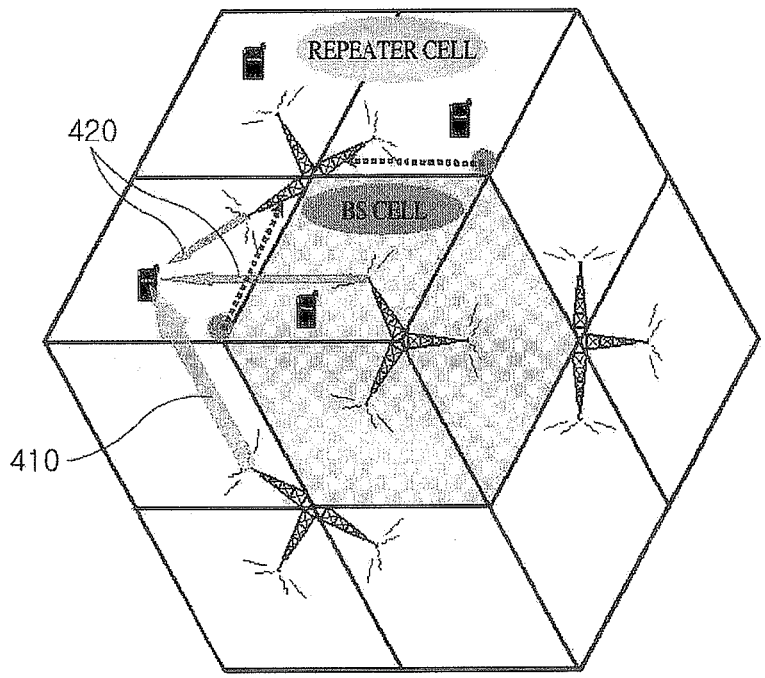
FIG. 4 is a diagram showing the construction of a distributed repeater system according to a further embodiment of the present invention.

FIG. 4 is a diagram showing the construction of a distributed repeater system according to a further embodiment of the present invention. As shown in FIG. 4, the distributed repeater system includes four areas including a single base station service area and three repeater service areas in a conventional base station cell sector, as in the case of the system of FIG. 3.

However, the system of FIG. 4 is configured in a structure in which repeaters are arranged at the boundaries of a base station cell, but unlike the system of FIG. 3, three repeaters are installed at a single location to cover three repeater service areas. That is, for nine repeater service areas located outside the base station cell, three repeaters are installed to be merged at each of the three locations, thus enabling all repeater service areas to be covered. In detail, the number of repeaters in each sector is determined according to N=2*(R/r)+1, and is equal to the number of repeater service areas. It is possible to arrange one repeater at the boundary between the base station service area and each of three repeater service areas to cover each repeater service area, as shown in FIG. 3. However, as shown in FIG. 4, it is possible to arrange three repeaters at one location (for example, a central boundary) of the boundaries between the base station service area and the three repeater service areas outside the base station service area, and to allow each of the repeaters to cover a corresponding one of the three repeater service areas.

Similarly to the system of FIG. 3, the system of FIG. 4 determines the number of repeaters and output powers according to the ratio (R/r) of the base station service radius to the repeater service radius. Accordingly, there are advantages in that a system capable of improving the network average capacity by decreasing UARI or DARI and by remarkably reducing coverage holes and excessive coverage overlaps can be provided, and in that, since service can be provided using three repeaters by installing a single cable, the installation of the repeaters is facilitated, and thus the network can be rapidly configured. Of course, wireless repeaters can also be simply installed.

Furthermore, networks can be selectively variously configured according to the circumstances through the structure of a system for determining the number of repeaters and output powers according to the ratio of the base station service radius to the repeater service radius. For example, each conventional base station sector is divided into six areas. One of the six areas is a base station service area, and the remaining five areas are repeater service areas. Five repeaters are located at the boundaries between the base station service area and the distributed repeater service areas, and the output powers of the base station sector and the respective repeater cells are determined according to the above-described equation. The reason for this is that the structure of a hexagonal-shaped distributed repeater system must be maintained independent of a radio environment.

The repeaters used for the network configuration of the distributed repeater system proposed in the present invention are preferably implemented as one of frequency conversion repeaters, microwave repeaters, and optical repeaters. The construction and functions of such a repeater will be described later.

[Mode for Invention]

Figure 5:
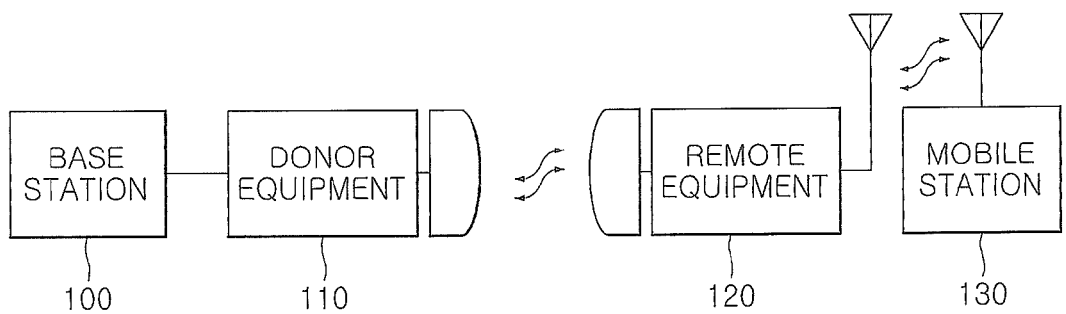
FIG. 5 is a diagram showing the construction of a microwave repeater.

A repeater refers to a device for amplifying signals from a base station and providing service to radio blocking regions which are caused by mountains, buildings or other topographic features, or shadow areas such as tunnels or subway parking lots, to which radio waves cannot be easily transferred so that the signals can be successfully transferred to such a region, and for coupling signals from terminals in the shadow areas to the base station so that the signals are successfully transferred to the base station. FIG. 5 is a diagram showing the construction of a microwave repeater. As shown in FIG. 5, the microwave repeater includes donor equipment 110 and remote equipment 120 for relaying signals between a base station 100 and a mobile station 130.

The donor equipment 110 receives commercial frequency signals from the base station 100, converts the commercial frequency signals into microwave signals, and transmits the microwave signals to the remote equipment 120 in a wireless manner. That is, the donor equipment 110 receives the signals transmitted from the base station 100, converts the received signals into 1718GHz microwave frequency signals through a microwave module provided therein, and finally transmits the microwave frequency signals to the remote equipment 120 installed in a remote shadow area through a parabolic antenna.

The remote equipment 120 converts the microwave frequency signals transmitted from the donor equipment 110 into commercial frequency signals, and amplifies the commercial frequency signals to high power according to the circumstances, thus extending a new coverage area. That is, the parabolic antenna receives the signals, which have been converted into 17 to 18 GHz microwave frequency signals and have been transmitted, converts the microwave frequency signals into commercial frequency signals through a series of processes, such as filtering, low-noise amplification, high-power amplification, and frequency conversion, and transmits the commercial frequency signals to a shadow area. The above processes have been described on the basis of a downlink operation, and an uplink operation is performed in the reverse order of the downlink operation.

Figure 6:
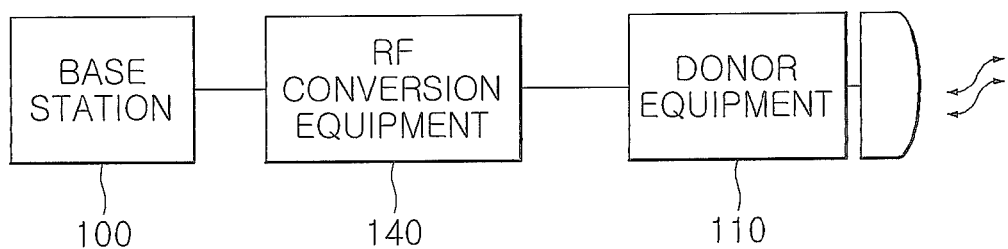
FIG. 6 is a diagram showing the construction of a frequency conversion repeater.
Figure 7:
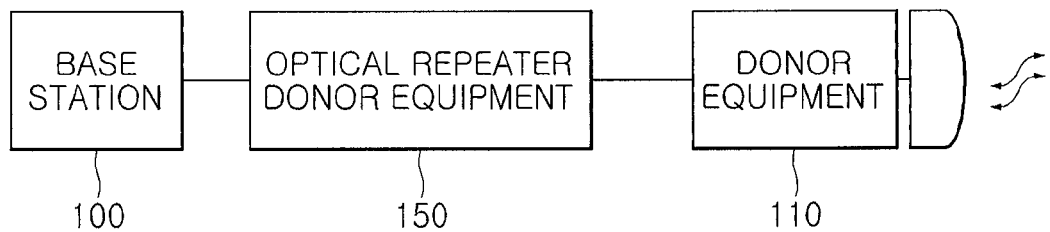
FIG. 7 is a diagram showing the construction of an optical repeater.

Meanwhile, methods in which the donor equipment 110 receives signals from the base station 100 may include 1) a method of directly connecting to the coupler terminal of the base station 100 in a wired manner and receiving commercial frequency signals from the base station 100, 2) a method of converting commercial frequency signals into low frequency signals through RF conversion equipment 140 and receiving the low frequency signals in a wired manner, as shown in FIG. 6, and 3) a method of receiving optical signals through an optical path using optical repeater donor equipment 150, as shown in FIG. 7.

If the above-described frequency conversion repeater converts RF signals from the base station into available empty Frequency Assignment (FA) signals and transmits the FA signals to an antenna, and thereafter the FA signals are received and converted into original frequency signals at a remote place, the frequency conversion repeater can prevent oscillation because frequencies between input/output antennas are different. The frequency conversion repeater is advantageous in that, since it can easily secure the isolation of an antenna, the coverage of a slightly wide area can be acquired, and in that the frequency conversion repeater is appropriate to an area for which it is difficult to secure isolation.

However, as methods of eliminating a plurality of shadow areas attributable to domestic environments, that is, the existence of a plurality of service providers and topographical features, only an RF link has limitations in connection and service between a base station and shadow areas. Accordingly, a wired link-type repeater between a base station and service areas, which is capable of solving such a problem, has been considered. A representative technology thereof is an optical repeater which adopts an optical link, that is, optical transmission technology.

Such an optical repeater can transfer signals at high quality and can realize high-power service over a wider area by transmitting RF signals from the base station to a service area through an optical link having excellent characteristics. Accordingly, the optical repeater is advantageous in that it can be used as a simple base station instead of the base station.

As shown in FIG. 7, an optical repeater system includes optical repeater donor equipment 150 for directly splitting signals from the base station 100 through a coupler, converting the split signals into optical signals, transmitting the optical signals to a shadow area, converting reverse signals, which have been converted into optical signals and have been transmitted from the shadow area, into electrical signals, and providing the electrical signals to the base station, and donor equipment 110 for converting optical signals transmitted from the optical repeater donor equipment 150 into electrical signals, amplifying the electrical signals through a high-power amplifier, providing the amplified electrical signals to the shadow area through an antenna, converting signals received from a terminal into optical signals, and transmitting the optical signals to the optical repeater donor equipment 150.

Figure 8:
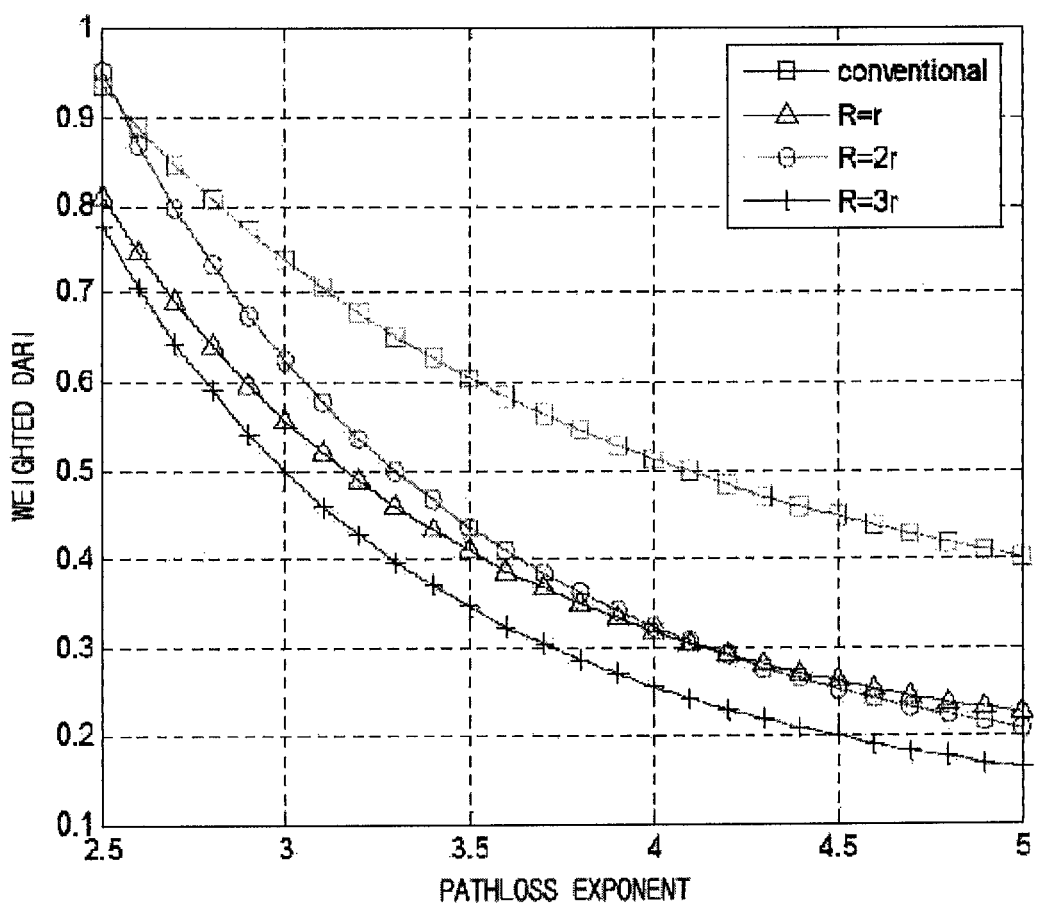
FIG. 8 is a graph showing downlink average ratio of the other-cell interference to the other-user interference in the serving cell (DARI) of the distributed repeater system according to the present invention.

FIG. 8 is a graph showing the downlink average ratio of the other-cell interference to the other-user interference in the serving cell (DARI) of a distributed repeater system according to the present invention. As shown in FIG. 8, it can be seen that, compared to the values of DARI of a conventional network system, values of DARI of a distributed repeater system network proposed in the present invention can be remarkably reduced. In addition, it can be clearly seen that, as the number of repeaters of the distributed repeater network proposed in the present invention increases, values of DARI gradually decrease.

However, it can be seen that, when a path loss exponent is about 3.8, values of the DARI of a network having three repeaters (the case of R=r) are almost equal to those of a network having five repeaters (the case of R=2r). Further, when the network having three repeaters is compared to the network having five repeaters, it can be seen that values of DARI of the network having three repeaters are lower than those of the network having five repeaters at locations having path loss exponents equal to or less than 3.8 on the basis of a location having a path loss exponent of 3.8, and that values of the DARI of the network having five repeaters are lower than those of the network having three repeaters at locations having path loss exponents equal to or greater than 4.2.

Figure 9:
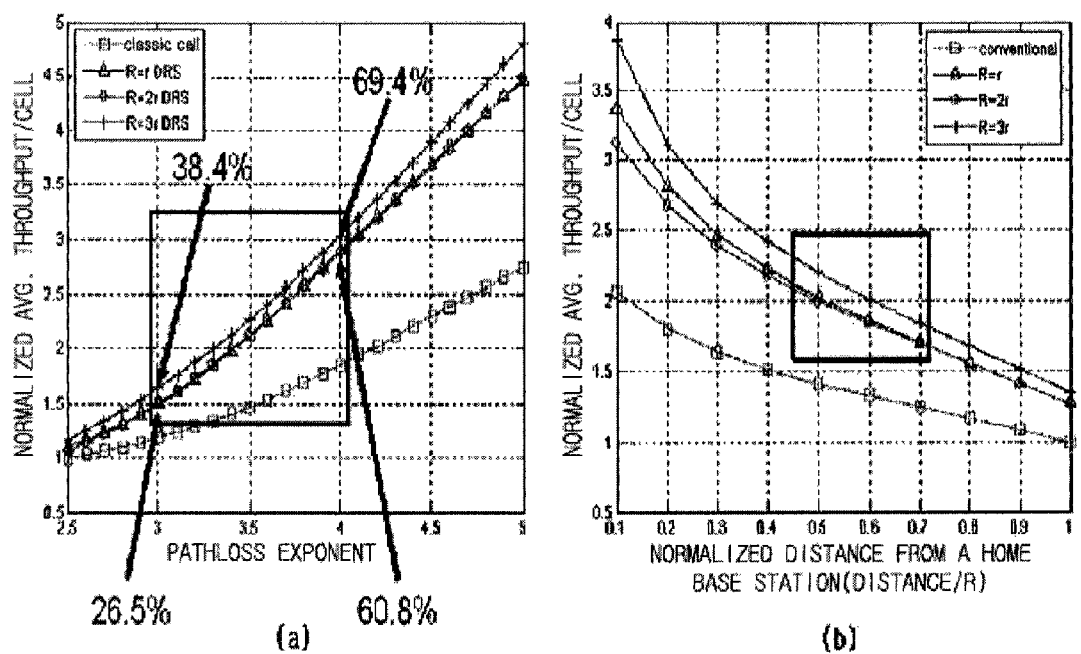
FIG. 9 is a graph showing the comparison between the downlink capacity of a distributed repeater system according to the present invention and the downlink capacity of a classic network.

Accordingly, it can be seen that, as the number of repeaters increases, the values of DARI entirely decrease in metropolitan areas having high path loss exponents or outer regions having low path loss exponents depending on the radio environment, but it is efficient to use three repeaters in every respect. That is, it is more preferable to use three repeaters from the standpoint of cost versus efficiency because the difference between the case using three repeaters and the case using five repeaters is not large. Therefore, in consideration of this relationship, a high-efficiency distributed repeater system network can be configured at more suitable and low costs by varying the configuration of a distributed repeater system depending on respective areas. FIG. 9 is a graph showing the comparison of the downlink capacity of a distributed repeater system network according to the present invention with the capacity of a classic network. FIG. 9(a) illustrates a graph comparing downlink output capacity versus path loss exponents attributable to the radio environment and FIG. 9(b) illustrates a graph comparing the downlink output capacity versus the distances from a base station.

As shown in FIG. 9(a), it can be seen that the downlink capacity of a system network according to the present invention increases compared to that of the classic network. Further, it can be seen that, when a path loss exponent is 3, the downlink capacity increases from 26% obtained when the number of repeaters is 3 or 5, to 38% obtained when the number of repeaters is 7, and that, when a path loss exponent is 4, the downlink capacity increases from 60% to about 70%. That is, the capacity increases in metropolitan areas having high path loss exponents, and also increases as the number of repeaters increases. However, even in this case, it can be seen that, since the difference between the case using three repeaters and the case using five repeaters is not large, it is more preferable to use three repeaters from the standpoint of cost versus efficiency. Of course, the uplink average ratio of the other-cell interference to the other-user interference in the serving cell (UARI) is also improved similarly to DARI, and thus uplink output capacity increases.

FIG. 9(b) illustrates a graph showing the output capacity of the system network according to the present invention versus the ratio of a cell radius (R) to the distance from the base station. As shown in FIG. 9(b), it can be seen that the downlink output capacity of the distributed repeater system network according to the present invention is greater than that of the conventional network. Further, it can be seen that, as the base station gets closer to the boundary (distance R from the base station) between a base station service area and a repeater service area, that is, as the base station gets closer to the repeater, interference attributable to the repeater increases, and thus downlink output capacity decreases. Even in this case, it can be seen that, since the difference between the case using three repeaters and the case using five repeaters is not large, it is more preferable to use three repeaters from the standpoint of cost versus efficiency.

As described above, when the distributed repeater system and method of arranging distributed repeaters according to the present invention are provided, there are advantages in that a system, capable of improving network average capacity by decreasing the average ratio of the other-cell interference to the other-user interference in the serving cell (UARI or DARI) and by remarkably reducing coverage holes and excessive coverage overlaps, can be provided, and, in addition, a network can be easily installed and rapidly configured by enabling service to be provided using three repeaters through the installation of a single cable.

Although the preferred embodiments of the present invention have been disclosed for illustrative purposes, the present invention is not limited to the above embodiments and drawings, and various modifications and changes are possible by those skilled in the art without departing from the scope and spirit of the invention. Accordingly, the scope of the present invention should be defined by the accompanying claims and equivalents thereof.

The invention claimed is:

1. A method of arranging distributed repeaters in a base station cell composed of a plurality of sectors in a mobile communication system, comprising the steps of:
dividing the base station cell into a base station service area and one or more repeater service areas, formed outside the base station service area, in each sector; and
arranging one or more repeaters at boundaries between the base station service area and the repeater service areas,
wherein a number of the one or more repeaters (N) is determined according to a ratio of a radius (R) of the base station service area to a radius (r) of each repeater service area, and
wherein the number of the one or more repeaters (N) arranged in each sector of the base station cell is determined by the following equation:

$$N=2*(R/r)+1.$$

2. The method according to claim 1, wherein output powers of the base station and the one or more repeaters are determined according to the ratio of the base station service radius (R) to the repeater service radius (r).

3. The method according to claim 2, Wherein the output powers of the base station and the one or more repeaters satisfy the following equation:

$$P_b = \frac{(\Phi_{rr})^\gamma \cdot P_{cb}}{(2\Phi_{rr}+1)+(\Phi_{rr})^\gamma}$$

$$P_r = \frac{P_{cb}}{(2\Phi_{rr}+1)+(\Phi_{rr})^\gamma}$$

where $P_b$ is output power of the base station, $P_r$ is output power of each repeater, $P_{cb}$ is a sum of powers to be used, $\Phi_{rr}$ is the ratio (R/r) of the base station service radius to the repeater service radius, and $\gamma$ is a path loss exponent corresponding to a radio environment.

4. The method according to claim 1, wherein the one or more repeaters are arranged such that a ratio of another cell interference to another user interrenee in a serving cell is minimized.

5. The method according to claim 1, wherein the one or more repeaters arranged in each sector include three repeaters arranged at one location of boundaries between the base station service area and three repeater service areas outside the base station service area.

6. The method according to claim 5, wherein the ratio of the base station service radius (R) to the repeater service radius (r), that is, R/r, is 1.

7. A distributed repeater system, comprising:
a base station composed of a plurality of sectors and configured such that a base station service area is formed in each sector; and
one or more repeaters configured to form repeater service area and arranged at boundaries between the base station service area and the repeater service areas in each sector,
wherein a number of the one or more repeaters (N) is determined according to a ratio of a radius (R) of the base station service area to a radius (r) of each repeater service area, and thus the one or more repeaters are arranged, and
wherein the number of the one or more repeaters (N) arranged in each sector of the base station cell is determined by the following equation:

$N=2*(R/r)+1$.

8. The distributed repeater system according to claim 7, wherein output powers of the base station and the one or more repeaters are determined according to the ratio of the base station service radius (R) to the repeater service radius (r).

9. The distributed repeater system according to claim 8, wherein the output powers of the base station and the one or more repeaters satisfy the following equation:

$$P_b = \frac{(\Phi_{rr})^\gamma \cdot P_{cb}}{(2\Phi_{rr}+1)+(\Phi_{rr})^\gamma}$$

$$P_r = \frac{P_{cb}}{(2\Phi_{rr}+1)+(\Phi_{rr})^\gamma}$$

where $P_b$ is output power of the base station, $P_r$ output power of each repeater $P_{cb}$ is a sum of powers to be used, $\Phi_{rr}$ is the ratio (R/r) of the base station service radius to the repeater service radius, and $\gamma$ is a path loss exponent corresponding to a radio environment.

10. The distributed repeater system according to claim 7, wherein the one or more repeater is arranged such that a ratio of another cell interference to another user interference in a serving cell is minimized.

11. The distributed repeater system according to claim 7, wherein the one or more repeaters arranged in each sector include three repeaters arranged at one location of boundaries between the base station service area and three repeater service areas outside the base station service area.

12. The distributed repeater system to claim 11, wherein the ratio of the base station service radius (R) to the repeater service radius (r), that is, R/r, is 1.

* * * * *